US006615234B1

(12) United States Patent
Adamske et al.

(10) Patent No.: US 6,615,234 B1
(45) Date of Patent: Sep. 2, 2003

(54) SYSTEM AND METHOD FOR NETWORK-BASED DOCUMENT DELIVERY

(75) Inventors: Bradley S. Adamske, San Juan Capistrano, CA (US); Matthew C. Todish, Austin, TX (US)

(73) Assignee: Taylor Corporation, North Mankato, MN (US)

( * ) Notice: Subject to any disclaimer, the term of this patent is extended or adjusted under 35 U.S.C. 154(b) by 0 days.

(21) Appl. No.: 09/309,757

(22) Filed: May 11, 1999

(51) Int. Cl.[7] .............................................. G06F 15/16
(52) U.S. Cl. ....................... 709/203; 709/200; 709/202; 709/206; 709/237; 715/523; 715/526
(58) Field of Search ................................ 709/200–207, 709/217–229, 232, 237–239, 244; 707/10; 715/513, 523–524, 526–527

(56) References Cited

U.S. PATENT DOCUMENTS

| | | | | |
|---|---|---|---|---|
| 5,790,790 A | | 8/1998 | Smith et al. ................. 709/206 |
| 5,974,441 A | * | 10/1999 | Rogers et al. ............... 709/200 |
| 6,119,137 A | * | 9/2000 | Smith et al. ................. 707/523 |
| 6,151,675 A | * | 11/2000 | Smith .......................... 713/153 |
| 6,170,007 B1 | * | 1/2001 | Venkatraman et al. ...... 709/218 |
| 6,192,407 B1 | * | 2/2001 | Smith et al. ................. 709/229 |
| 6,222,634 B1 | * | 4/2001 | Dubbela et al. ............ 358/1.15 |
| 6,438,584 B1 | * | 8/2002 | Powers ........................ 709/206 |
| 6,567,850 B1 | * | 5/2003 | Freishtat et al. ............ 709/224 |

* cited by examiner

Primary Examiner—Bharat Barot
(74) Attorney, Agent, or Firm—Gray, Plant, Mooty, Mooty & Bennett, P.A.

(57) ABSTRACT

A system and method for delivering an electronic document over a network, printing in hard copy form at a remote destination, and delivery of the hard copy document to a recipient. A user sends the electronic document to a server over a client-server network (which can be the Internet) where a conversion software program converts the electronic document from its client application format to a printable format (e.g., a PostScript file). A print preview program then converts printable version of the electronic document to a graphical view format. The user can now preview the document on-line to determine how the hard copy document will look upon delivery. The printable version of the electronic document is then transmitted across a printing network (which can also be the Internet) to a print spooler server. The print spooler server prints a hard copy version of the document on an attached printer. The hard copy document is then either delivered to the recipient or held for pick-up by the recipient.

27 Claims, 3 Drawing Sheets

SYSTEM AND METHOD FOR NETWORK-BASED DOCUMENT DELIVERY

TECHNICAL FIELD OF THE INVENTION

The present invention relates generally to the field of computer network systems and methods. More particularly, the present invention relates to systems and methods for transmitting an electronic document over a network (e.g., the Internet) and delivering the document in hard copy form to a recipient.

BACKGROUND OF THE INVENTION

The information age has arrived and the delivery of information in a timely manner continues to become increasingly important in the global marketplace. Many companies rely on the ability to move information in a very short period of time in today's marketplace.

Electronic mail, or e-mail, provides a mechanism for sending information in electronic form as electronic messages from one computer user to another over a network. Sending information in e-mail messages over the Internet has become commonplace for many businesses to accomplish basic communication. However, e-mail is typically produced in an ASCII based format that is often problematic for communication of formatted or complex documents that include such features as PostScript formatted objects, page layout grids, multiple or unusual fonts, graphics, tables, and other complex formatting. Furthermore, use of e-mail does not result in the delivery of a hard copy of the document to the recipient. The attachment of documents to an e-mail requires each recipient to have an e-mail account and the appropriate application loaded on the receiving computer in order to view and/or print the document.

Thus, while some types of information can be transmitted in electronic form via e-mail, many companies require and/or prefer delivery of this information in hard copy form. Delivery of hard copy documents can currently be accomplished using a variety of document carriers, including Express Mail, UPS, and Federal Express. However, this document delivery method also has many limitations. These document carriers do not provide for the conversion of electronic documents to hard copy. A user must print out the document(s), schedule a pick-up, ensure the documents are ready by the pick-up time, and properly package the document(s). Furthermore, a user cannot send a document to multiple geographic locations using a single transaction.

Other methodologies have been developed to deliver electronic documents over a network, including the Internet, such as that developed by Tumbleweed (as illustrated in U.S. Pat. No. 5,790,790). However, these prior art systems typically require the recipient to have a computer and the application in which the document was created in order to view and/or print the document. Furthermore, these systems generally require the recipient to retrieve the electronic document from a defined location on a network server. These systems also do not provide an electronic print preview option to allow real-time viewing of the document on the network prior to delivery of the hard copy to the recipient. Nor do these systems provide tracking of the location of the document between sending and delivery of the document. In addition, none of these prior art electronic-based document transfer systems contain a mechanism to allow on-line collaborative signature capability prior to delivering the hard copy document.

SUMMARY OF THE INVENTION

The present invention provides a network-based document delivery system and method that substantially eliminates or reduces disadvantages and problems associated with previously developed document delivery systems methods used to deliver hard copy documents to a recipient.

More specifically, the present invention provides a system for transmitting an electronic document over a network and delivering a hard copy of the document to a recipient. The document delivery system includes a client computer that a user uses to send the electronic document to a server over a client-server network (which can be the Internet) where a conversion software program converts the electronic document from its client application format to a printable format (e.g., a PostScript file). A print preview program then converts printable version of the electronic document to a graphical view format. The user can now preview the document on-line to determine how the hard copy document will look upon delivery. The printable version of the electronic document is then transmitted across a printing network (which can also be the Internet) to a print spooler server. The print spooler server prints a hard copy version of the document on an attached printer. The hard copy document is then either delivered to the recipient or held for pick-up by the recipient.

The present invention provides an important technical advantage by providing a single-solution, network-based document delivery system and methodology that allows the delivery of hard copy documents using computer software programming and existing network technologies for as rapid as same day delivery.

The present invention provides another technical advantage by providing the user a real-time preview of the document on-line as it will appear in printed form after delivery.

The present invention provides yet another technical advantage by allowing a user to deliver hard copy documents starting from an electronic format without requiring the sender to convert the electronic document to hard copy. The conversion from electronic to hard copy is done for the sender by the present invention.

The present invention provides another technical advantage by providing the capability to deliver a hard copy document to geographically distinct locations in a single transaction.

The present invention provides another technical advantage by converting electronic documents to hard copy documents without requiring the receiving party to have either a computer or the application in which the electronic document was created.

The present invention provides still another technical advantage by delivering the electronic document to a remote printer and producing a hard copy without requiring the user to retrieve or pull down the electronic version of the document from a server or URL on the network.

The present invention provides another technical advantage by providing a database of fonts in order to facilitate document conversion into a printable format.

The present invention provides yet another technical advantage by providing an collaborative signature feature that allows each signatory of a document to "sign" the document on-line prior to delivery.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the Figures, like numerals being used to refer to like and corresponding parts of the various drawings.

The document delivery system of the present invention incorporates computer software programming and a wide area network that allows a user to transmit an electronically created document from a user's computer over the Internet or other network to a strategically located printer for delivery in hard copy form to the recipient. The methodology of the present invention allows a user to have an electronic document delivered in hard copy form to any number of geographically remote locations in a number of hours or less. The present invention includes a real-time print preview capability that allows a user to view the document as it will print at the delivery destination prior to sending the document. The present invention can also include an on-line collaborative signature capability that allows all signatories of a document to "sign" the document prior to delivering the document in hard copy according to the present invention.

Figure 1:
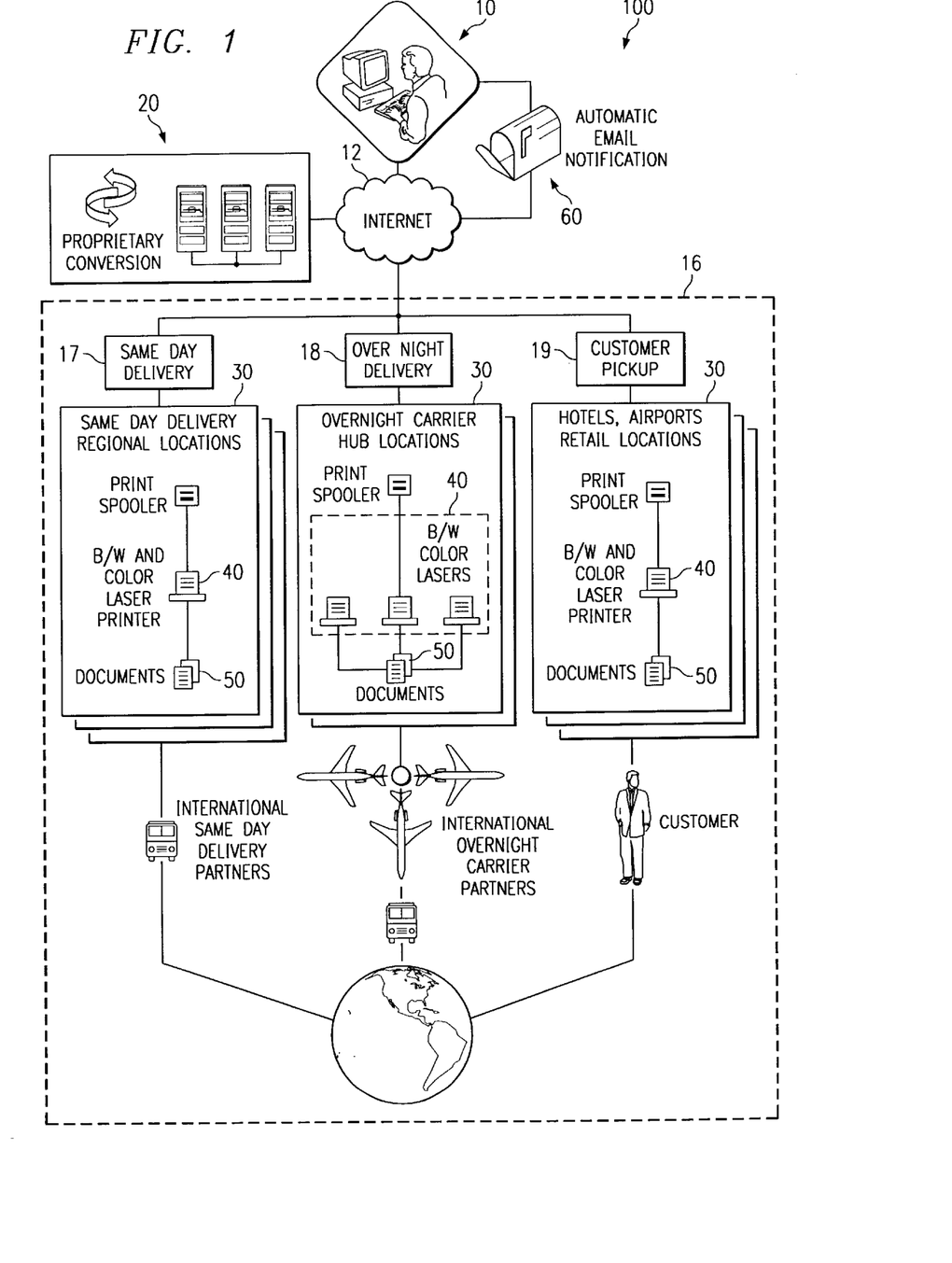
FIG. 1 shows a functional block diagram of one embodiment of the document delivery system of the present invention.

FIG. 1 shows document delivery system 100 that includes a number of computers, referred herein to as either client or server computers, each of which includes a central processing unit (CPU) or processor connected to a bus, a random access memory (RAM) and a secondary storage device also connected to the bus. Each computer program incorporated into the present invention can reside in RAM during execution. Alternatively, each computer program can be stored in a computer readable medium of a removable computer disk, such as a floppy or compact disk. Each computer program described as a part of the present invention includes instructions that, when executed, cause the CPU to perform the functions described herein.

FIG. 1 shows an overview of the document delivery system 100 of the present invention in an Internet environment. It should be understood that the present invention can also operate as described over other networks or intranets. User 10 will connect to a document delivery server system 20 via the Internet using an Internet browser (such as Microsoft Internet Explorer or Netscape Navigator). User 10 uploads an electronic version of a document over the network 12 (which in the embodiment shown is a private network, but can also be the Internet) to the document delivery server system 20 where the electronic document is converted to a user-viewable print preview format that is displayed to user 10 at the user's computer. In an alternative embodiment, a print driver program 14 can be loaded on the user's computer to bypass the browser. In this alternative embodiment, the print preview is performed locally on the user's computer prior to delivery of the document.

At the print preview stage, user 10 can see the document as it will print at the ultimate delivery location. Based on this preview of the document, user 10 can make changes to the electronic document, re-upload the electronic document for conversion, and preview the document once again prior to approving the document for delivery. The document delivery server system 20 will compress, encrypt, and route the electronic document via the network 12 to a print spooler server 30 at a delivery destination 16. The electronic document is then printed on a printer 40 connected to the print spooler server 30. The hard copy document 50 can then be delivered to the recipient.

The precise delivery destination 16 to which the electronic document will be sent is determined by the delivery mechanism chosen by user 10. If user 10 desires same day delivery of the hard copy document 50, the electronic document is sent over the network 12 to a same-day delivery location where a courier (e.g., Sonic Air or Sky Couriers) will retrieve the hard copy document 50 from the printer 40 and deliver the document overland immediately upon receipt. If user 10 desires overnight or two-day delivery of the hard copy document 50, the electronic document is sent over the network 12 to an overnight delivery service 18 (e.g., United Parcel Service, Airborne Express or Federal Express). The overnight delivery service 18 will retrieve the hard copy document 50 from printer 40, package the hard copy document 50 and route it via plane and courier using its existing network. If user 10 desires delivery to a customer pick-up location (e.g., hotel, retail location, etc.) so the recipient can pick-up the hard copy document 50, the electronic document is sent over the network 12 to a customer pick-up location to be printed on printer 40 and held for the recipient at the customer pick-up location.

Upon completion of printing the hard copy document 50 at printer 40, document delivery system 100 can send user 10 an e-mail notification 60 that the electronic document was delivered over the network 12, a hard copy document 50 was printed, and the hard copy document 50 is being prepared for delivery or is ready for customer pick-up. User 10 can also receive a delivery e-mail notification 60 including the date, time, signatory and other information to confirm the hard copy documents 50 were delivered or picked up.

Figure 2:
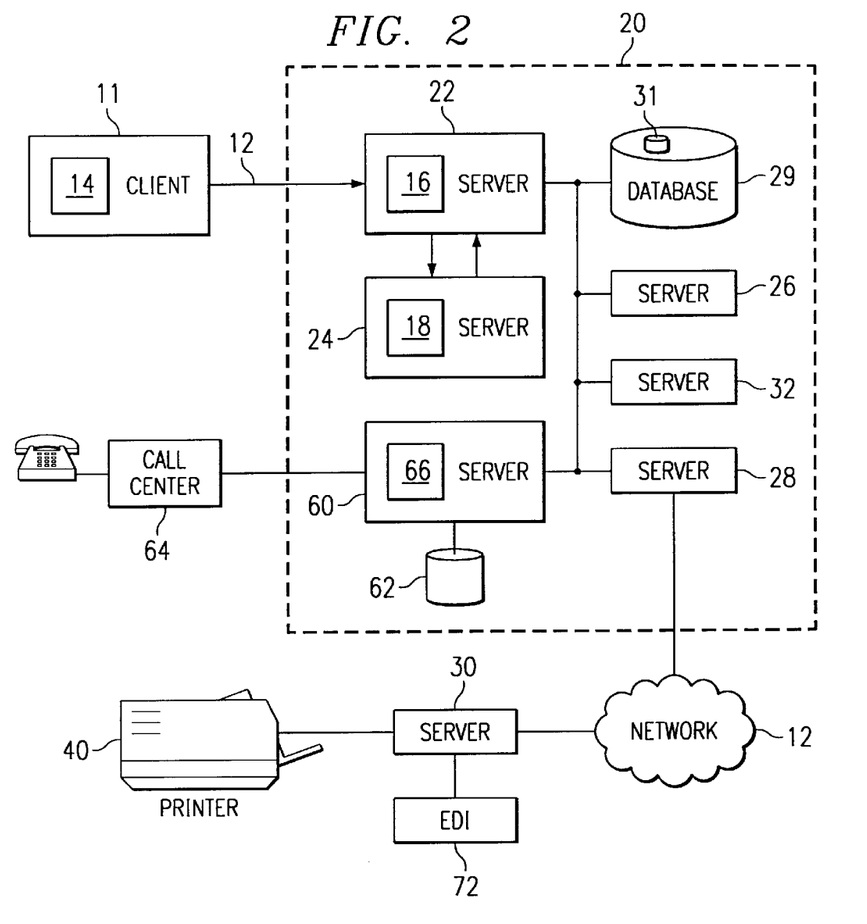
FIG. 2 shows a functional block diagram of a portion of the document delivery system of FIG. 1 including a more detailed view of an embodiment of the document delivery server system according to the present invention.

FIG. 2 shows a portion of the document delivery system 100 of FIG. 1 including a more detailed view of the document delivery server system 20. As shown in FIG. 2, client computer 11 connects to the document delivery server system 20 via network 12 (e.g., the Internet). In the embodiment shown in FIG. 2, document delivery server system 20 includes web server 22, application translation server 24, centralized file server 26, and print manager server 28, and database 29. In the embodiment that will be described herein, each of these servers represents a distinct computer, however, it should be understood that as long as each server operates in the same environment, these servers could reside on a single computer. In the embodiment of FIG. 2, web server 22, centralized file server 26, and print manager server 28 operate in a Unix environment, while application translation server 24 operates in an NT environment. It should be further understood that any of the servers could operate in either environment, or even in other environments. The document delivery server system 20 further connects, via network 12, to remote printer spooler server 30 connected to printer 40 at the delivery destination.

Figure 3:
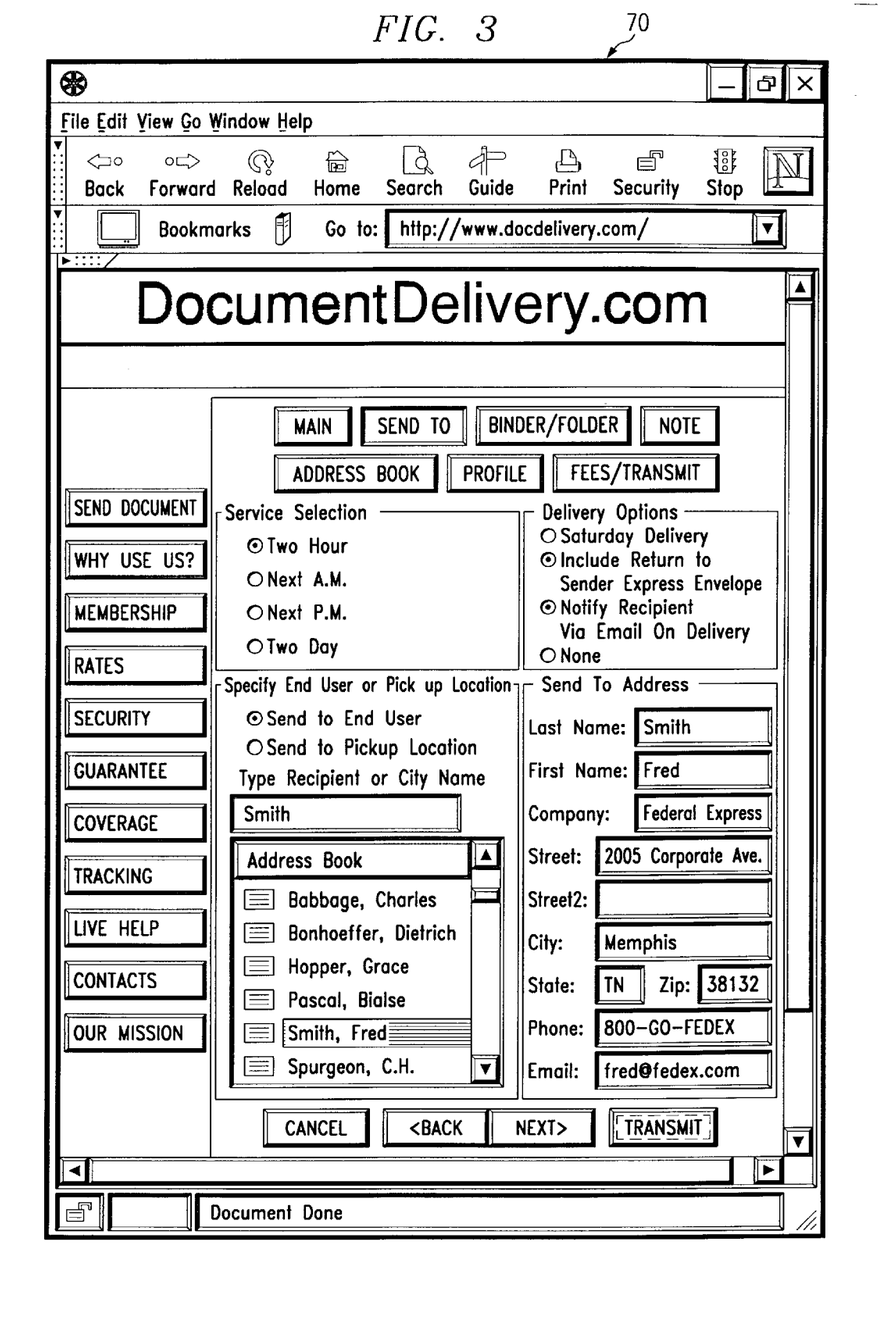
FIG. 3 shows a screen shot of a web page representing an operational screen at which a user can specify preferences regarding delivery of the hard copy document.

In operation, user 10 will connect at client computer 11 to web-based server 22 via the network 12 using a web browser. User 10 has a document, created in any client application, that is stored electronically in local memory on the client computer 11. User 10 will access a web site at web-based server 22. The web site can include log-on and authentication steps that verify the identity of user 10. Web server 22 can be a secure HTTP (HTTPS) server that will require user 10 to enter a set of user authorization information. Web server 22 will access the user authorization information from a look-up table stored in database 29 to verify that user 10 can have access and send documents using the document delivery system 100. Upon successful authorization, web server 22 can return an operational screen 70, an example of which is shown in FIG. 3. Using operational screen 70, user 10 can select between any number of delivery options. As shown in FIG. 3, user 10 can choose from several methods of delivery for their document, including the type of service (e.g., two hour, next morning, next afternoon or two day delivery), delivery to the recipient or recipient pickup, and other special delivery options.

User 10 then uploads the electronic document from client computer 11 to web server 22 using a standard web browser or using e-mail having the electronic document attached. In either case, web server 22 routes the electronic document to application translation server 24 for conversion. Application translation program 18 houses the variety of client applications that users use to create electronic documents. Application translation server 24 includes a conversion program 18 that is executable to read in the electronic document and convert the document to a portable printable format. Any electronic document format can be supported (e.g., Microsoft Office™, Lotus Smart Suite™, Novell WordPerfect™, etc.) simply by loading the appropriate client application on the application conversion server 24.

In the embodiment shown in FIG. 2, the conversion program 18 is written as a Windows NT™ service that uniformly converts every electronic document into a portable printable format, regardless of the client application used to create the electronic document. In the embodiment described, the application translation server 24 executes conversion program 18 to open the user's electronic document using the appropriate client application and instructs the application to output the electronic document as an Adobe PostScript™ file. This PostScript file is then used for subsequent processing. Thus, the conversion program 18 reads in the electronic document from the web server 22, determines the client application in which the document was created, opens this client application resident on the application translation server 24, opens the electronic document using the client application, converts the electronic document into a printable (e.g., PostScript) format file, and closes the converted electronic document.

In order to facilitate the conversion, database 29 can include a font database 31 that can be accessed by conversion program 18 during conversion of the electronic document from the application format to the PostScript format in order to process the variety of fonts that are used when creating electronic documents. By installing a large font database 31 and numerous ancillary applications (such as Visio® or Harvard Graphics®) on the translation application server 24, the present invention can support the delivery of almost any electronic document currently in use. Future client applications can be supported by simply installing these client applications on the translation application server and incorporating the necessary conversion code for each new client application into conversion program 18. Application translation server 24 can be infinitely scaled through the use of layer-4 type TCP/IP load sharing devices to balance the conversion between multiple servers.

Application translation server 24 then returns the converted printable electronic document (e.g., in a PostScript format) to web server 22 and temporarily stores the converted printable electronic document on the centralized file server 26. The converted printable electronic document is then processed at web server 22 to create web-viewable print preview files for user 10 to view. To accomplish this print preview feature, web server 22 can include a print preview software program 16 that is executable to further convert the converted printable electronic document into a series of graphical preview images, such as JPEG thumbnails and full-sized preview images. The print preview software program 16 can be, for example, the Ghostscript software developed by GNU. The JPEG thumbnail and full-sized preview images are also stored on centralized file server 26 at a particular URL. User 10 can use the client-side web browser to preview the document (e.g., in JPEG format) to see how the document will look in printed, hard copy form upon delivery to the recipient. The conversion of the original electronic document into a web-viewable format that replicates the form of the final hard copy document allows the user to confirm the hard copy format electronically. This on-line print preview allows the user to complete a web-based delivery of the hard copy document entirely electronically. By converting the printable PostScript files to a JPEG format, user 10 can preview the document using a standard web browser without any plug-ins or software add-ons.

In the aforementioned web-based embodiment, the client interface to the document delivery server system 20 of the present invention can be a standard web browser. In this embodiment, the hard copy document delivery can be accomplished without requiring any plug-ins or client side applications. However, an alternative embodiment includes a client-based application that interfaces directly with web server 22 to bypass the web browser and allow user 10 to deliver documents from within any standard application or platform (e.g., Microsoft Windows, Palm Pilot or other application/platform). In this alternative embodiment, client computer 11 includes a print driver program 14 resident on memory that is executable to convert the electronic document and provide the print preview capability prior to uploading to the web server 22. Print driver program 14 can be downloaded onto client computer 11 from web server 22. Thus, by using print driver program 14, user 10 need not connect to web server 22 to accomplish the conversion and print preview functions.

Print driver program 14 thus includes all of the functionality of the print preview software program 16. The print driver software program 16 accesses the client application 14 on client computer 11 and creates a metafile from the electronic document. This metafile provides user 10 a viewable representation of how the hard copy document will look upon printing at printer 40. If this is acceptable, user 10 sends this metafile to translation server 24 through web server 22 and the conversion into a printable (e.g., PostScript) version is performed as previously described. All other functions of the present invention from that point forward to printing are as previously described. By using a secure web server 22 (e.g., c2net StrongHold®), the present invention can maintain content security from client computer 11 to the document delivery network.

After user 10 verifies the print preview, at operational screen 70 user 10 can select media options (e.g. duplex printing, paper or transparencies, color or black and white), output handling options (e.g. stapled, bound, placed in folders or binders) and destination(s)/recipient(s). User 10 can also specify delivery instructions and select billing/payment options (e.g. credit card payment or corporate charge). All of this information can be stored in database 29. Database 29 can include the user's log in, user ID, password, address book and billing information. Database 29 can also include financial allocation information for the third-party partners to track what third-party partner performed the delivery (if applicable) and the amount owed each third-party partner. Database 29 can also contain pointers pointing to where each converted document (in PostScript or other portable printable format) resides on centralized file server 26 and information linking each stored document to a user. In addition, database 29 also serves as a central repository for all of the electronic documents delivered to the various destination printers via web server 22. Database 29 will also contain a table of locations for all potential destinations and the print spooler server ID numbers at these locations. When user 10 selects a destination and service selection, web server 22 will match the destination to a particular print spooler server ID and will include in the overhead associated with the document that print spooler server ID.

Further, a "file cabinet" and an "address book" can be provided to user 10 through either the web interface or the client-side print driver program 14. The file cabinet is an on-line repository of electronic documents that have been previously uploaded by user 10. The file cabinet allows for rapid delivery of commonly used documents (product flyers, company financial reports, etc.). These file cabinet documents are physically stored on centralized file server 26 and can be indexed by user 10 and organization in database 29. The address book is a stored repository of names and addresses to allow the user to rapidly specify delivery information and can be stored entirely in database 29.

Print management server 28 will retrieve the converted printable (PostScript) electronic document and will send the document to the particular remote print spooler server 30 having the ID included at web server 22 via network 12. Network 12 can be the Internet or a private network connection for high traffic destinations such as an airborne courier. The print spooler server 30 prints the document at printer 40 attached locally to print spooler server 30. Print spooler server 30 controls the setting of (e.g., duplex mode, etc.) and printing at each locally attached printer 40. The hard copy document is then packaged according to the user preferences defined at operational screen 70 and delivered to the user-designated recipient(s). Optionally, the print job that produces the hard copy document can also include a print out of the packaging instructions selected by the user, a cover sheet, and a shipping label (if applicable).

As shown in FIG. 2, each remote print spooler server 30 is connected to a print manager server 28 via network 12. Each remote print spooler server 30 can connect to a print manager server 28 over a single TCP connection that initiates at print spooler server 30. This architecture allows a simplified configuration environment that eliminates the requirement to maintain the remote IP address of each remote print spooler server 30. Further, this configuration allows the support of dynamic print spooler server IP addresses at the remote locations, if necessary. In this configuration, only one TCP connection is required to administer and monitor print spooler server 30 and printer 40 status, and to send documents.

Upon printing of the hard copy document, print spooler server 30 will connect back to print manager server 28 to (1) update the database record to indicate the document has printed and (2) initiate a notification e-mail to the user. Print manager server 28 determines the ID, and therefore location, of remote print spooler server 30 when this connection is made and updates the record associated with the document delivered in database 29. The updated information will indicate the hard copy document printing is complete.

Document delivery system 100 can notify user 10 that the hard copy documents were delivered (and optionally that the hard copy documents were printed prior to delivery). To determine when hard copy documents have been printed, the print manager server 28 can periodically poll the print spooler servers 30 in the document delivery system 100 to determine the status of all hard copy print jobs. When the print manager server 28 polls a print spooler server 30 and discovers a hard copy document has been printed, the print manager server 28 can cause mail server 32 to generate an e-mail notification that is sent to user 10 via network 12 to indicate the document has been printed.

The document delivery system 100 can also provide notification of hard copy document delivery. The notification of hard copy document delivery can be provided to print manager server 28 from the third party at whose facility the print spooler server 30 and printer 40 reside using an electronic data interchange system 72 (EDI). Using EDI 72, the third party delivery service can notify the print manager server 28 (either through print spooler server 30 as shown in FIG. 2, or directly through a connection to the print manager server 28) that the hard copy document is delivered or picked up. Print manager server 28 will then cause mail server 32 to generate an e-mail notification to user 10 indicating the hard copy document was delivered.

The present invention also provides a unique collaborative signature feature that allows user 10 and any other required signatories on a document to sign the document on-line prior to delivery of the document. Thus, the hard copy documents delivered to the recipient(s) are signed when delivered. With reference to FIG. 2, a signature server 60 is included within document delivery server system 20. Signature server 60 includes a collaborative signature program 66 that is executable to perform the collaborative signature functions. Signature database 62 is connected to signature server 60 and contains a set of identifying information for each signatory, including a pass phrase, a user ID, and an on-line signature. The signatures for each individual signatory can be scanned into and electronically stored in signatory database 62 (optionally, in an encrypted format). Each signatory can then call into signature server 66 through a call center 64 to initially establish a user ID and a pass phrase (either in audio or numeric form), which are also stored within signature database 62. Both the pass phrase and user ID provide layers of security. Other forms and methods of securing the on-line collaborative signature feature can easily be incorporated into the present invention.

For a document requiring signatures prior to delivery of the hard copy, user 10 can specify at web server 22 any number of signatories. User 10 can specify signatories by e-mail address. Web server 22 will then check the signature database 62 to determine if each of the user-designated e-mail addresses has a corresponding electronic signature. If not, user 10 receives a message that the designated e-mail address (i.e., signatory) does not have on-line signature capability. If the signatories do have electronic signatures, web server 22 can then forward an e-mail to each required signatory to inform each of them that the document is available for signature at a particular URL and that the document requires that party's signature. Each signatory could then access the document at the designated URL (i.e., at the print preview stage) and enter the proper user ID. The signatory could then flip through the web pages (i.e., pages of the document) to get to the signature line and then click on the signature space of the electronic document. Web server 22 would then access signature database 62 and place the signatory's signature (i.e., the electronic signature associated with the user ID in signature database 62) on the electronic document. For greater security, web server 22 would not release the document until the signatory further authenticates the signature.

The following illustrates one way for the collaborative signature function of the present invention to obtain proof of identity of the signatory. It should be understood that other means for obtaining proof of identity could be employed in this collaborative signature function. The signatory could call into signature server 60 through call center 64 and identify the document signed and provide his/her proper pass phrase and user ID. This delivery of data from the phone line to signature server 60 can be accomplished using standard and developing computer telephony integration (CTI) programs and hardware. Signature server 60 will verify the user ID against the pass phrase in signature database 62. Note that in an alternative embodiment, signature server 60 could now place the signature associated with the user ID onto the document (as opposed to allowing the signatory to sign first and verify later).

At this point all users with access to the document can use the print preview function described herein to see all of the signatory signatures that have been placed on the document to date, or otherwise indicate the signatories have electronically signed the document. The document will be held at web-server 22 until all designated signatories have signed and verified the signatures. At that point, web server 22 will release the document for delivery to destination printer 40 as described earlier. Accordingly, the hard copy delivered to the recipient(s) will have all required signatures upon delivery. The advantage of this collaborative signature feature of the present invention is that the signatures, like the print preview, can be accomplished entirely on-line.

It should be understood that the on-line collaborative signature feature of the present invention, while shown in the context of a document delivery system, is equally applicable to any other system or method requiring on-line document signature capability.

Although the present invention has been described in detail, it should be understood that various changes, substitutions and alterations can be made hereto without departing from the spirit and scope of the invention as described by the appended claims.

What is claimed is:

1. A system for delivering an electronic document over a network and for printing in hard copy at a destination, comprising:

a client computer on said network for sending the electronic document, wherein the electronic document is in an application format;

a server computer system on said network operable to:
receive the electronic document from the client computer,
convert the electronic document from the application format to a printable format, referred to as a printable electronic document, and
convert the electronic document from the application format or printable format to a graphical view format that replicates in electronic form how the electronic document will print in hard copy form;

a printing system including a print spooler server on said network and a printer, wherein the print spooler server is connected to the printer, and wherein the server computer system is operable to transmit the printable electronic document to the print spooler server, and wherein the print spooler server is operable to print a hard copy of the printable electronic document on said printer; and a web server configured to generate one or more web pages accessible by the client computer.

2. The system of claim 1, wherein the electronic document in the graphical view format is presented on at least one of the one or more web pages accessible by the client computer.

3. The system of claim 1, wherein the server computer system further comprises an application translation server connected to the web server,
wherein the web server is configured to receive the electronic document from the client computer; and
the application translation server is configured to receive the electronic document from the web server, and convert the electronic document from the application format to the printable format.

4. The system of claim 1, further comprising a centralized file server connected to the web server, wherein the centralized file server is operable to receive from the server computer system and store the printable electronic document and the electronic document in the graphical view format.

5. The system of claim 1, further comprising:
a print manager server connected to the web server and the printing system, wherein the server computer system is further configured to send the printable electronic document to the print manager server, and
a mail server connected to the print manager server, wherein the print manager server:
transmits the printable electronic document to the printing system;
polls the printing system at intervals to determine if the electronic document has been printed in hard copy; and
sends an initiation to the mail server indicating the hard copy of the document has been printed.

6. The system of claim 5, wherein the mail server sends an e-mail notification to the client computer indicating the hard copy of the document has been printed.

7. A system for delivering an electronic document over a network and for printing in hard copy at a destination, comprising:

a client computer on said network for sending the electronic document, wherein the electronic document is in an application format;

a server computer system on said network operable to:
receive the electronic document from the client computer,
convert the electronic document from the application format to a printable format, referred to as a printable electronic document, and
convert the electronic document from the application format or printable format to a graphical view format that replicates in electronic form how the electronic document will print in hard copy form;

a print spooler server on said network and connected to a printer, wherein the server computer system is operable to transmit the printable electronic document to the print spooler server, and wherein the print spooler server is operable to print a hard copy of the printable electronic document on said printer; and a database of fonts that is accessible by the server computer system to facilitate the conversion of the electronic document to the printable electronic document.

8. The system of claim 7, wherein the server computer system is further operable to arrange for delivery of the hard copy of the document to a recipient.

9. The system of claim 7, wherein the server computer system comprises a web server configured to generate one or more web pages accessible by the client computer.

10. The system of claim 9, wherein the electronic document in the graphical view format is presented on at least one of the one or more web pages accessible by the client computer.

11. The system of claim 9, wherein the server computer system further comprises an application translation server connected to the web server,
    wherein the web server is configured to receive the electronic document from the client computer;
    the application translation server is configured to receive the electronic document from the web server, and convert the electronic document from the application format to the printable format.

12. The system of claim 9, further comprising a centralized file server connected to the web server, wherein the centralized file server is operable to receive from the server computer system and store the printable electronic document and the electronic document in the graphical view format.

13. The system of claim 9, further comprising:
    a print manager server connected to the web server and the print spooler server, wherein the server computer system is further configured to send the printable electronic document to the print manager server, and
    a mail server connected to the print manager server, wherein the print manager server:
        transmits the printable electronic document to the print spooler server;
        polls the print spooler server at intervals to determine if the electronic document has been printed in hard copy; and
        sends an initiation to the mail server indicating the hard copy of the document has been printed.

14. A system for delivering an electronic document over a network and for printing in hard copy at a destination, comprising:
    a client computer on said network, wherein the client computer is operable to convert the electronic document to a metafile having a graphical view format, and to send the metafile;
    a server computer system on said network operable to:
        receive the metafile from the client computer,
        convert the metafile to a printable form, referred to as a printable electronic document, and
        transmit the printable electronic document to a printing system on said network; and
    a print spooler server on said network and connected to a printer, wherein the server computer system is operable to transmit the printable electronic document to the print spooler server, and the print spooler server is operable to print a hard copy of the printable electronic document that corresponds to the graphical view format of said electronic document on said printer; and
    a database of fonts that is accessible by the server computer system to facilitate the conversion of the electronic document to the printable electronic document.

15. The system of claim 14, wherein the server computer system is further operable to arrange for delivery of the hard copy of the document to a recipient.

16. A system for transmitting an electronic document over a network and delivering a hard copy of the electronic document created in a client computer application to a recipient, comprising a computer program stored in computer-readable form on a server, the computer program comprising:
    a conversion program executable by the server to convert the electronic document to a printable format;
    a print preview program executable by the server to convert the electronic document from the printable format to a graphical view format; and
    a delivery program executable by a processor to transmit the printable version of the electronic document from the server to a printing system.

17. The system of claim 16, wherein the electronic document is in a client computer application format:
    read in the electronic document in the client computer application format;
    open a copy of the corresponding client computer application;
    convert the electronic document from a client computer application format to a printable format; and
    transmit the electronic document in the printable format to the delivery program.

18. The system of claim 16, wherein the print preview program is further executable to:
    read in the electronic document in the printable format; and
    convert the electronic document from the printable format to a graphical format that can be viewed by a user to see how the document will print in hard copy form at the printer.

19. The system of claim 16, wherein the server computer system is further operable to arrange for delivery of the hard copy of the document to a recipient.

20. A method for transmitting an electronic document over a network and delivering a hard copy of the electronic document to a recipient at a remote location, comprising:
    sending the electronic document from a client computer to a server computer system over a network;
    converting the electronic document to a printable format, referred to as a printable electronic document;
    converting the electronic document to a graphical view format that replicates in electronic form how the electronic document will print in hard copy form;
    printing a hard copy document of the printable electronic document that corresponds to the graphical view format of said electronic document; and
    delivering the hard copy document to the recipient.

21. The method of claim 20, wherein the step of delivering the hard copy document to the recipient comprises scheduling delivery by a delivery service.

22. The method of claim 20, wherein the step of delivering the hard copy document to the recipient comprises printing the hard copy document at a location for recipient pick-up.

23. The method of claim 20, wherein the server computer system further comprises a web server and an application translation server connected to the web server, and wherein the method further comprises:
    reading the electronic document in the client computer application format from the web server to the application translation server;
    opening a copy of the client computer application resident on the application translation server;
    converting the electronic document from a client computer application format to a printable format; and
    storing the electronic document in the printable format.

24. The method of claim 23, further comprising:
    reading the electronic document in a printable format from the application translation server to the web server; and converting the electronic document from a printable format to a graphical web-viewable format that replicates in electronic form how the document will print in hard copy form at the printer.

25. The method of claim 24, further comprising:

presenting the electronic document in the graphical web-viewable format on at least one web page to allow the document to be previewed electronically using the client computer.

26. The method of claim 23, wherein the server computer system further comprises a centralized file server connected to the web server, and wherein the method further comprises storing the printable format of the electronic document in the centralized file server.

27. The method of claim 23, wherein the server computer system further comprises a print manager server connected to the web server, a print spooler server connected to the print manager server, and wherein the method further comprises:

transmitting the printable format of the electronic document to the print manager server, the print manager transmitting said printable format of the electronic document to the print spooler server;

polling the print spooler server at intervals to determine if the electronic document has been printed in hard copy; and sending an electronic notification to the client computer indicating the hard copy of the document has been printed, or has been delivered, or both.

* * * * *